United States Patent Office 2,752,123
Patented June 26, 1956

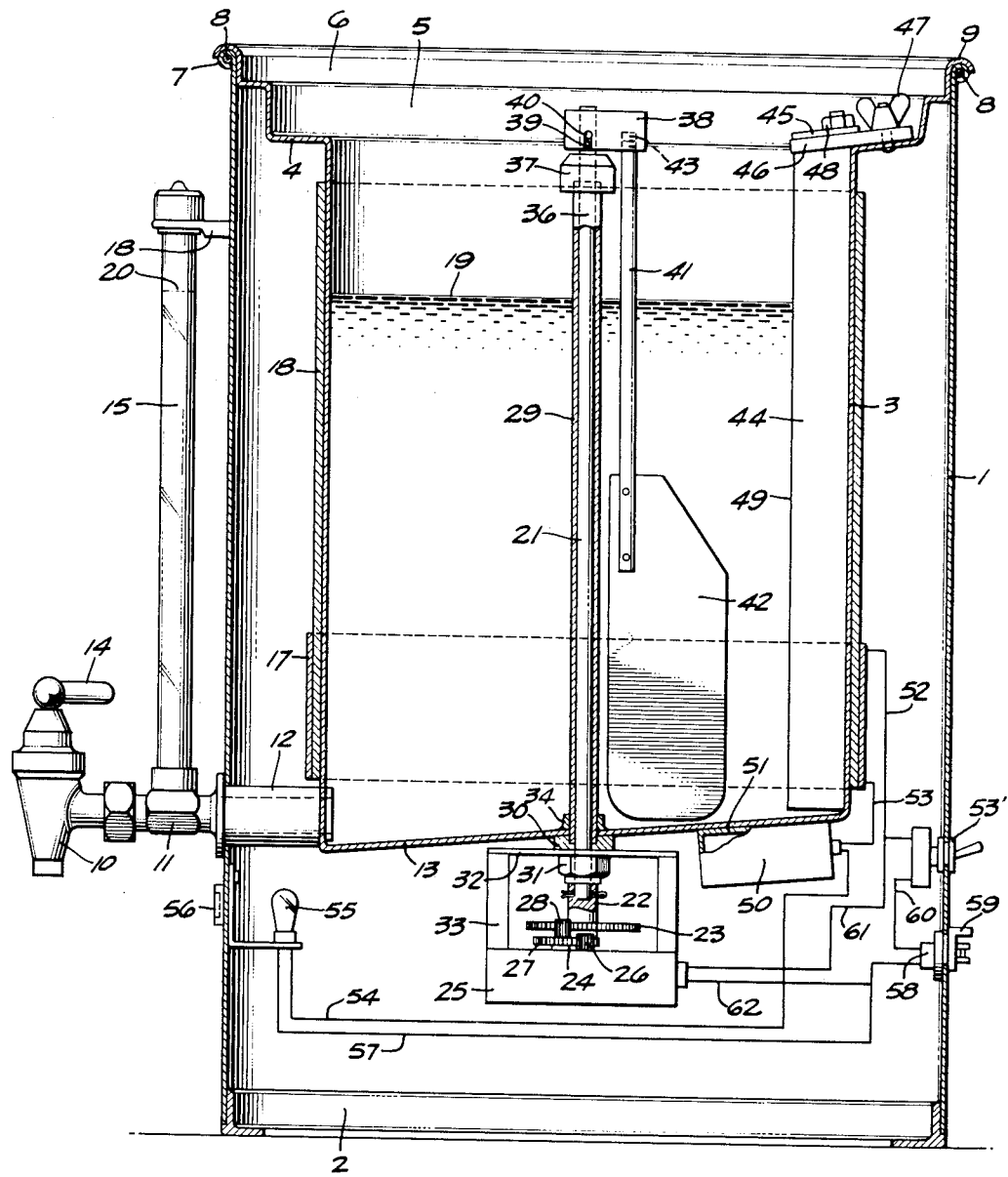

2,752,123

BEVERAGE HEATING AND DISPENSING APPARATUS

Andrew L. Deuschel and Elsworth C. Austin, Los Angeles, Calif.; said Austin assignor to said Deuschel Application December 8, 1953, Serial No. 396,831

1 Claim. (Cl. 257—2)

This invention relates to a dispenser for liquids and while features of the invention may be employed in apparatus for holding liquids of any kind, it is described in the following specification as applied to apparatus for containing a supply of hot chocolate beverage ready to be dispensed by the cupful as may be desired.

It is characteristic of chocolate beverage that considerable difficulty is encountered when it is attempted to maintain it at a uniform hot temperature for beverage purposes due to the fact that if any portion of it becomes overheated, it tends to become unduly viscous and may tend to become caky.

One of the objects of this invention is to provide apparatus having features of construction that co-operate to overcome these difficulties and which can function satisfactorily to maintain a supply of this beverage at a desired temperature without danger of overheating, any part of the supply.

More specifically stated, an object of the invention is to provide apparatus for this purpose which operates to impart heat to the supply of beverage chocolate by means that functions to impart the heat throughout a considerable area of the wall of the container regardless of whether such wall is a good conductor of heat.

Another object of the invention is to provide improved means for stirring and agitating the liquid being heated in the apparatus.

Further objects of the invention will become apparent from a careful reading of the specification and study of the drawing accompanying this specification.

The invention consists in the novel parts and combinations of parts to be described hereinafter, all of which contribute to produce an efficient beverage dispensing apparatus.

A preferred embodiment of the invention is described in the following specification, while the broad scope of the invention is pointed out in the appended claim.

In the drawing: the figure is substantially a cross-section in a vertical plane on the axis of the container, some parts, however, being broken away, and others on the said axis being shown in side elevation.

Referring particularly to the parts of the apparatus illustrated, 1 indicates a cylindrical casing the lower end of which is open and provided with a reinforcing base-ring 2 that fits into its lower end, where it is secured by any suitable means such as welding or riveting.

Suspended within this casing and coaxial therewith is a liner 3 the upper end of which is in the form of a pressed flange 4 of "jog" form, that is to say, it presents a portion 5 of a diameter intermediate between that of the shell and that of the liner 3, which operates as a container for the liquid, in this case hot chocolate beverage.

The upper end of the liner includes an integral collar 6 of a diameter to fit neatly into the upper end of mouth of the casing. At this point the casing is formed with a roll or rolled flange 7 bent around a steel ring 8; and in order to support the container 3 in position, the upper edge of the collar 6 is formed with a half-round flange or roll 9 that rests on the upper side of the rolled flange 7.

On the forward side of the apparatus a hand controlled valve 10 is provided, attached to an outlet fitting 11 that includes a tubular neck 12 that passes through the casing at its outer end and through the wall of the container 3 at its inner end. This tubular outlet 12 for the beverage is located adjacent to the bottom 13 of the container, which is disposed in an inclined position so that any liquid in the container will drain readily toward the outer tube 12.

The fitting 11 includes a handle 14 for operating the valve, and also operates as a connection for the lower end of the sight gage 15 the upper end of which connects to a bracket 16 secured on the outer face of the container.

The container 3 is preferably formed of stainless steel or a material having its characteristics. This material has high tensile strength and is also highly resistant to the action of weak acids such as might be present in any beverage supply held in the container to be dispensed into cups held beneath the valve 10.

In order to maintain the chocolate beverage in a highly fluid condition we provide a heating element 17 which is preferably an electric heating element in the form of a band that encircles the wall of the container near its lower end; and in order to distribute the heat both radiant heat and from conduction to substantially the entire length of the container, we provide a sleeve 18 composed of a highly conductive material or metal such as aluminum, duraluminum, copper, or other conductive metal, and the lower end of this sleeve lies between the heating element 17 and the wall of the container and touches both.

This shell 18 operates effectively to carry the heat from the relatively highly heated lower end, up to a point near the upper end of the container and even above the level of the upper surface of the beverage supply, the level of which may be located as indicated by the dotted line 19. This line is also indicated at the line 20 in the sight gage.

While the use of this heat-distributor sleeve 18 is highly beneficial, the effect of preventing any overheating of the chocolate beverage at any point, is also contributed to considerably by means we employ for continuously stirring the supply of cholocate within the container. In order to accomplish this we prefer to provide a vertical driving shaft 21 which passes up from a coupling 22 that constitutes the hub of a large gear 23 driven through back-gearing 24 from the shaft of an electric motor 25.

This back-gearing includes a pinion 26 centered on the motor shaft which drives a gear 27 having an upper hub that is a pinion 28 concentric with the large gear 23. While this back-gearing is described in detail, it is understood that any other type of back-gearing may be employed.

The shaft 21 is sealed off from contact with the supply of beverage within the container because it is encased in a tube 29, preferably composed of stainless steel, and the lower end of which is stepped in a counter-sunk socket in the upper side of a spacer 30 that seats against the lower face of the bottom 13. This spacer 30 has a threaded tubular nipple on its underside (not illustrated) that receives a clamping nut 31 that clamps up against the underside of a cover plate 32, said cover-plate is provided with a plurality of circumferentially spaced posts 33 the lower ends of which connect to and support the casing of the motor 25.

At the point where the lower end of the casing tube 29 passes through the bottom 13 this connection is sealed off by a permanent sealing ring 34 that seats upon the upper face of the bottom 13.

The upper end 35 of the shaft 21 projects beyond the upper end 36 of the tube 29 and at this point a sealing device 37 is employed to prevent any possibility of the contained beverage entering the upper end of the tube in case the liquid level should rise to an unintended height in the container.

Beyond the seal 37 a block-form short radial arm 38 is provided, the bottom face of which is provided with a transverse slot 39. This slot is wide enough to receive the projecting ends of a cross pin 40 which passes through the end 35 of the shaft 21.

The underside of the arm 38 carries a downwardly extending bar which extends about parallel to shaft 21, and the lower end of which carries a paddle or vane 42. These parts 41 and 42 are preferably of stainless steel, and the upper end of bar 41 may be secured to arm 38 with its upper end connected to the threaded socket 43.

While the R. P. M. speed of the vane 42 may be suited to any working conditions wherever employed, we have found that the speed of about 60 revolutions per minute is satisfactory under usual conditions.

In order to enhance the stirring effect occasioned by the rotating vane, and to cause the chocolate to be constantly circulated away from the immediate vicinity of the location of the heating element 17, we prefer to employ a baffle 44 which is in the form of a long flat bar preferably of stainless steel. Its upper end is bent over to form a flange 45 lying on the upper face of a thick short bar 46 the outer end of which is secured on the flange portion 4 by means of a bolt and wing nut 47. The flange 45 is also secured in place by a "hex" nut 48.

When the vane 43 rotates, it developes a circumferential swirl in the beverage near the bottom of the container, and the outer portion of the swirl comes in contact with the flat face of the bar 44. This causes currents and small swirls in the main swirl, and of course, this effects the directing of this bottom swirl away from the vicinity of the heater and the general direction of the axis of the container. If desired, this action of the baffle 44 may be increased by setting the blade 44 so that its inner edge 49 is disposed somewhat waywardly in the direction of the swirl; in other words, by giving the face of the blade 44 a slight pitch or inclination with respect to the direct movement of the beverage that would cause the beverage at that point to move along the face of the blade in an inward direction.

In order to maintain a substantially constant temperature in the beverage supply we prefer to employ a thermostatic device 50 which has a metallic box-form casing of conductive metal, and we secure this thermostatic casing with one of its side plates 51 superposed flatly against the underside of the bottom 13. The thermostatic device is available on the market and operates effectively to open the electric circuit through the heating element for any set temperature. This circuit includes a main conductor 52 leading up from the switch 53 located on the outer side of the casing, which conductor connects to one end of the resistance wire of the heating element, the other end of which is connected in series by a wire 53' to the thermostatic device 50, through a circuit wire 54 which leads over to an electric lamp 55 located back of a tell-tale colored window 56 set in the wall of the container at its forward side (indicating whether the heater circuit is closed), a return wire 57 from this lamp passes back to the inlet connection 58 for the service cable 59 that brings the commercial current to the container. The other wire 60 from this connection 58 passes up to the switch 53. The motor is supplied in a parallel circuit through a wire 61 which branches off from the wire 62. From the motor 25 a branch wire 62 leads back from the motor 25, and connects to the branch wire 57 from the lamp 55.

Many other embodiments of the invention may be resorted to without departing from the spirit of the invention.

We claim and desire to secure by Letters Patent:

In an apparatus for uniformly heating a beverage throughout its mass, the combination of a substantially cylindrical container having a heat conductive wall and a bottom wall, a heating element mounted on the outer side of the lower portion of the heat conductive wall above the level of the bottom, a heat distributing conductor element having a portion thereof interposed between the cylindrical wall and the heating element and in contact therewith, said conductive element having an extending portion lying along and in contact with the container wall above the level of the heating element, operating to withdraw heat from the immediate vicinity of the heating element and transmit the same to the container wall along its length, a thermo-static device mounted on the outside of the bottom wall and adjacent said conductive wall so as to receive heat therefrom, to control the functioning of said heating element, a baffle means extending upwardly along and connected to the inner wall of the container and extending below the level of said beverage, a flat, vertically disposed, elongated, radially extending, rotary stirring means mounted for rotation about the axis of the container and having its outer edge located at a substantial distance from the inner edge of the baffle means, means for rotating said stirring means to displace quantities of the beverage in the outer circumferential zone in which said baffle is located inwardly to mix with inner portions of the mass of beverage and thereby raising the temperature of portions of the mass of beverage that have not come in direct contact with the portions of the container wall that are heated by the heating element, and a dispensing outlet at the bottom of the container wall having a valve therein for controlling the dispensing of the beverage through said outlet.

References Cited in the file of this patent
UNITED STATES PATENTS

| | | |
|---|---|---|
| 535,230 | Stewart | Mar. 5, 1895 |
| 2,170,681 | Finlayson | Aug. 22, 1939 |
| 2,625,804 | Patch et al. | Jan. 20, 1953 |
| 2,638,329 | Weygand et al. | May 12, 1953 |